United States Patent
Chang et al.

(10) Patent No.: US 11,555,789 B2
(45) Date of Patent: Jan. 17, 2023

(54) SYSTEMS, METHODS AND APPARATUS FOR AUTONOMOUS DIAGNOSTIC VERIFICATION OF OPTICAL COMPONENTS OF VISION-BASED INSPECTION SYSTEMS

(71) Applicant: Siemens Healthcare Diagnostics Inc., Tarrytown, NY (US)

(72) Inventors: Yao-Jen Chang, Princeton, NJ (US); Benjamin S. Pollack, Jersey City, NJ (US); Rayal Raj Prasad Nalam Venkat, Princeton, NJ (US); Venkatesh NarasimhaMurthy, Hillsborough, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 17/278,282

(22) PCT Filed: Sep. 19, 2019

(86) PCT No.: PCT/US2019/052007
§ 371 (c)(1),
(2) Date: Mar. 19, 2021

(87) PCT Pub. No.: WO2020/061365
PCT Pub. Date: Mar. 26, 2020

(65) Prior Publication Data
US 2021/0333217 A1 Oct. 28, 2021

Related U.S. Application Data

(60) Provisional application No. 62/733,954, filed on Sep. 20, 2018.

(51) Int. Cl.
*G01N 21/88* (2006.01)
*G06V 10/60* (2022.01)
*G06V 10/141* (2022.01)

(52) U.S. Cl.
CPC ..... *G01N 21/8806* (2013.01); *G01N 21/8851* (2013.01); *G06V 10/141* (2022.01); *G06V 10/60* (2022.01)

(58) Field of Classification Search
CPC .......... G01N 21/8806; G01N 21/8851; G01N 21/9009; G01N 21/95; G01N 21/958;
(Continued)

(56) References Cited

U.S. PATENT DOCUMENTS 5,771,068 A 6/1998 Sali et al.
6,940,554 B2 9/2005 Robins et al.
(Continued)

FOREIGN PATENT DOCUMENTS

CN 103026720 B 11/2015
DE 10 2010 043632 A1 5/2012
(Continued)

OTHER PUBLICATIONS

Extended EP Search Report dated Oct. 18, 2021 of corresponding European Application No. 19862246.6, 4 Pages.
(Continued)

*Primary Examiner* — Hung V Nguyen (57) ABSTRACT

Methods of autonomous diagnostic verification and detection of defects in the optical components of a vision-based inspection system are provided. The method includes illuminating a light panel with a first light intensity pattern, capturing a first image of the first light intensity pattern with a sensor, illuminating the light panel with a second light intensity pattern different than the first light intensity pattern, capturing a second image of the second light intensity
(Continued)

pattern with the sensor, comparing the first image and the second image to generate a comparison of images, and identifying defects in the light panel or the sensor based upon the comparison of images. Systems adapted to carry out the methods are provided as are other aspects.

20 Claims, 10 Drawing Sheets

(58) Field of Classification Search
CPC .. G06V 10/141; G06V 10/60; G06V 2201/06; G06K 9/6201
See application file for complete search history.

(56) References Cited

U.S. PATENT DOCUMENTS

| | | | |
|---|---|---|---|
| 8,854,431 | B2 | 10/2014 | Song et al. |
| 9,796,089 | B2 | 10/2017 | Lawrence, III et al. |
| 10,453,215 | B2 * | 10/2019 | Park ........................ G06N 3/08 |
| 2011/0273569 | A1 | 11/2011 | Douady et al. |
| 2013/0271755 | A1 | 10/2013 | Lindner |
| 2014/0198202 | A1 * | 7/2014 | Kim ........................ G09G 3/006 |
| | | | 348/125 |
| 2016/0321796 | A1 | 11/2016 | Dornoni et al. |
| 2017/0255766 | A1 * | 9/2017 | Kaehler ............... G06V 40/197 |

FOREIGN PATENT DOCUMENTS

| | | |
|---|---|---|
| DE | 10 2014 203798 A1 | 9/2015 |
| JP | H5-302898 A | 11/1993 |
| JP | H8-068617 A | 3/1996 |
| JP | 2008-032653 A | 2/2008 |
| JP | 2016-224707 A | 12/2016 |
| WO | 2017/132162 A1 | 8/2017 |
| WO | 2018/089935 A1 | 5/2018 |

OTHER PUBLICATIONS

PCT International Search Report and Written Opinion dated Dec. 13, 2019 (8 Pages).

* cited by examiner

SYSTEMS, METHODS AND APPARATUS FOR AUTONOMOUS DIAGNOSTIC VERIFICATION OF OPTICAL COMPONENTS OF VISION-BASED INSPECTION SYSTEMS

RELATED APPLICATION

The present application claims priority to U.S. Provisional Patent Application No. 62/733,954, filed Sep. 20, 2018 and titled "METHOD AND DEVICE FOR AUTONOMOUS OPTICAL COMPONENTS HEALTH CHECK," which is incorporated herein in its entirety for all purposes.

FIELD

This disclosure relates to vision-based systems and more particularly, to systems, methods, and apparatus configured to carry out automated pre-inspection of biological specimens.

BACKGROUND

In some automated vision-based sample inspection systems, sample tubes containing specimens (e.g., biological specimens) can be positioned at a desired location in the vision-based sample inspection system and then one or more digital images can be obtained. Such systems can utilize optical components such as lighting panels (e.g., light emitting diode (LED) light panels) and optical sensors. From the obtained one or more digital images, various attributes of the specimens and/or the specimen containers containing the specimens can be obtained. For example, determination of various volumes of the components of the specimen can be obtained, such as serum volume, plasma volume, settled red blood cell volume of centrifuged specimens, existence of a gel separator, size of the sample tube, cap color, and the presence of an interferent, such as hemolysis (H), icterus (I), or lipemia (L), collectively HIL, and the like. Thus, systems, methods, and apparatus that exhibit robust operation are sought after.

SUMMARY

In some embodiments, a method for autonomous diagnostic verification of optical components of vision-based inspection systems is provided. The method includes illuminating a light panel with a first light intensity pattern; capturing a first image of the first light intensity pattern with a sensor; illuminating the light panel with a second light intensity pattern different than the first light intensity pattern; capturing a second image of the second light intensity pattern with the sensor; comparing the first image and the second image to generate a comparison of images; and identifying defects in the light panel or the sensor based upon the comparison of images.

In some embodiments, a vision-based inspection system operable to perform autonomous diagnostic verification of optical components is provided. The system includes a computer including a memory storing instructions executable by the computer, the instructions including: illuminate a light panel with a first light intensity pattern; capture a first image of the first light intensity pattern with a sensor; illuminate the light panel with a second light intensity pattern different than the first light intensity pattern; capture a second image of the second light intensity pattern with the sensor; compare the first image and the second image to generate a comparison of images; and identify defects in the light panel or the sensor based upon the comparison of images.

In some embodiments, an alternative method for autonomous diagnostic verification of optical components of vision-based inspection systems is provided. The method includes capturing a first image of an illuminated light panel with a sensor; activating a mask over the light panel; capturing a second image of the masked light panel with the sensor; comparing the first image and the second image to generate a comparison of images; and identifying defects in the light panel or the sensor based upon the comparison of images.

Numerous other aspects are provided in accordance with these and other aspects of the disclosure. Other features and aspects of the present disclosure will become more fully apparent from the following detailed description, the claims and the accompanying drawings.

DETAILED DESCRIPTION

In automated vision-based sample tube inspection systems that use optical components such as lighting (e.g., light emitting diode (LED) light panels) and optical sensors (e.g., charge-coupled device (CCD) or complementary metaloxide semiconductor (CMOS) image sensors), any defect in the lighting and/or sensors, such as a scratch or dirt particles thereon, could possibly impact the accuracy of the sample inspection. Therefore, in one aspect, methods and apparatus are provided to maximize correct operation of the optical components used. In particular, systems, methods and apparatus enabling autonomous diagnostic verification of optical components of vision-based inspection systems are provided.

The systems and methods of detecting defects in the optical components of the vision-based inspection system uses only the light sources and sensors already present in the inspection system. In other words, embodiments disclosed herein do not utilize additional hardware to test the existence of defects in the optical components of the vision-based inspection system.

The most intuitive method to inspect an optical system for defects is via direct manual visual inspection. However, this method may not be easily achievable, particularly if the optical components are installed inside an enclosure such that manual visual inspection may cause system downtime in order to dissemble the system, inspect components, and reassemble the system. While "hot pixels" or "dead pixels" of the sensor can be easily detected by viewing captured images taken while turning the lighting components on and off, defects such as dirt particles or scratches on either the sensor or light source are much more difficult to detect by using standard images captured by the sensor.

In some embodiments where the vision-based inspection system includes an LED light panel illuminated with multiple, independently controllable LEDs, embodiments of the disclosure involve generating a changeable light intensity pattern using different sets of the LEDs to illuminate the panel with two different (e.g., complementary) light intensity patterns so that captured images of the two different patterns can be compared to indicate the presence of a defect. In particular, areas that do not change between the two images can be identified as indicating the presence of the defect. In other words, if there are no defects, the image of the first light intensity pattern generated by a first set of LEDs will look different at all points on the LED panel than the image of the second light intensity pattern generated by a second (entirely different) set of LEDs. However, if there is a defect on the light panel or sensor, the area affected by the defect will not change appreciably or at all as compared to other areas between the images of the two different light intensity patterns. In essence, a defect that blocks light appears the same (i.e., consistent) in the two captured images even if the background illumination changes and by comparing images of different illumination patterns, an unchanged area can be used to identify the presence of a defect.

Figure 1A:
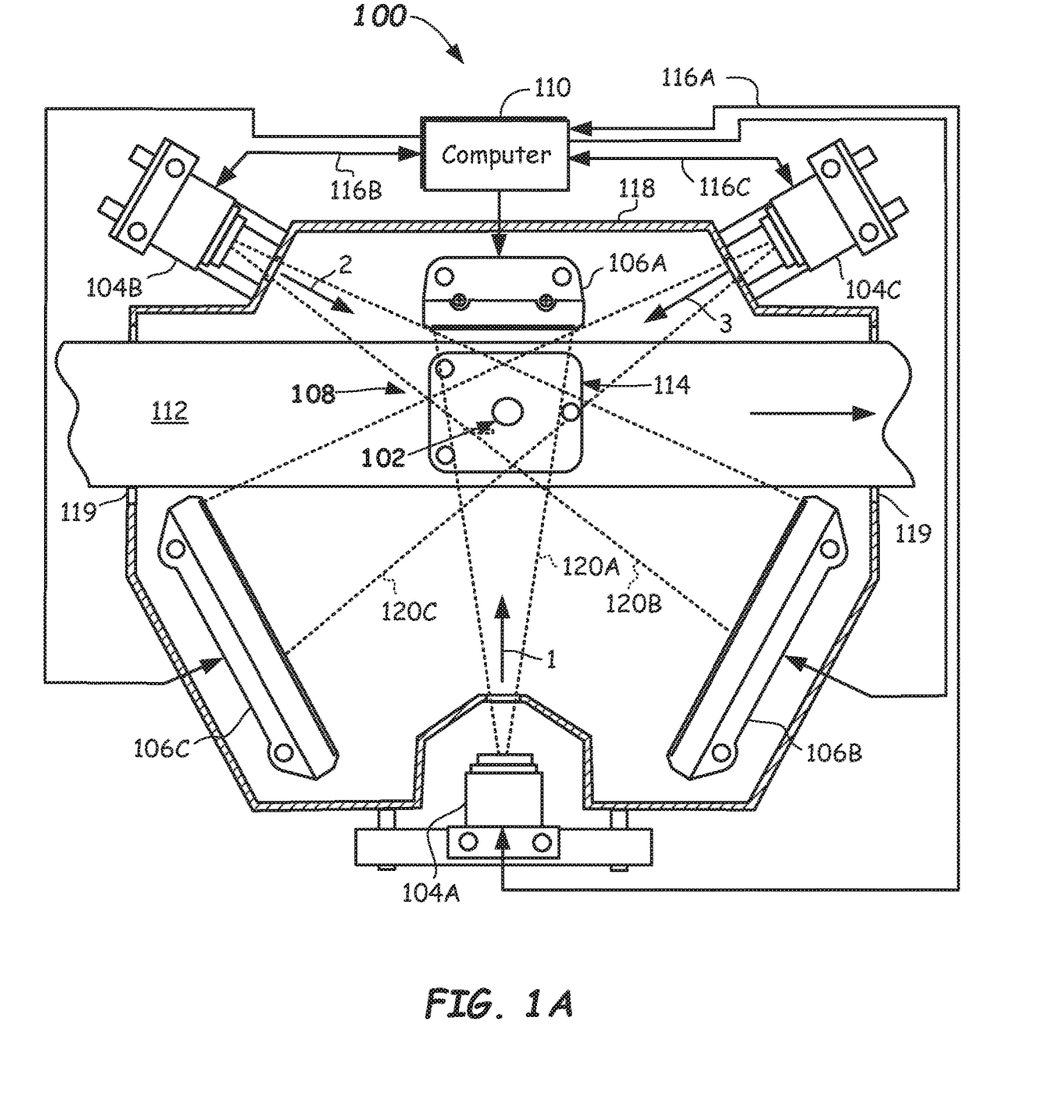
FIG. 1A is a schematic top view depiction of an example embodiment of a vision-based inspection system including an optical components diagnostic verification system according to embodiments of the present disclosure.

FIG. 1A depicts an example embodiment of a vision-based inspection system 100. Vision-based inspection system 100 allows multiple images of a specimen container 102 to be obtained from multiple viewpoints (e.g., viewpoints 1, 2, 3), wherein each viewpoint 1, 2, and 3, respectively, includes a sensor (e.g., an image capture device 104A-104C). Each respective viewpoint 1, 2, and 3 includes a light panel assembly 106A-106C as is shown in FIG. 1A. Vision-based inspection system 100 may be configured and adapted to automatically characterize and/or quantify a specimen (e.g., including a serum or plasma portion, a settled blood portion, or both) and/or may additionally or optionally quantify the specimen container 102 when the specimen is located at the imaging location 108. The imaging location 108 may be, for example, where the normal vectors from each of the viewpoints 1, 2, and 3 intersect.

The light panel assemblies 106A-106C of the vision-based inspection system 100 may be constructed using an array of LEDs (or other practicable light sources) optionally disposed behind or beside a diffuser and may be selectively switchable. The emitting light sources of the light panel assemblies 106A-106C may emit red (R), green (G), blue (B), white light, near infrared (NIR), and/or infrared (IR) spectra, for example. Three image capture devices 104A-104C are shown in FIG. 1A, but one or more, two or more, three or more, or even four or more such devices can be used. To minimize edge distortion, three or more sensors (e.g., image capture devices 104A-104C) may be used. Image capture devices 104A-104C may be conventional digital devices (e.g., CCD or CMOS devices) capable of capturing a digital image (i.e., a pixelated image). For example, three image capture devices 104A, 104B, 104C may be configured to capture images from multiple (e.g., three) different lateral viewpoints 1, 2, and 3 having a suitable image size, for example, to capture all or a representative portion of the specimen container 102. The multiple images captured may be processed by a computer 110 as will be described herein, and may in some instances, be processed by using "blocks" (e.g., a collection of pixels, such as an 11×11 grid of pixels).

Each image capture device 104A-104C may be configured and operable to take multiple lateral images of at least a portion of the specimen container 102 and at least a portion of the specimen contained therein. For example, the image capture device 104A-104C may capture a part of the specimen 212 and/or specimen container 102, including a label, a cap, and part of a tube. Eventually, from the multiple images, 2D data sets may be generated by each image capture device 104A-104C and stored in a memory of the computer 110. From these 2D data sets, processing of attributes of the specimen and/or the specimen container 102 can be undertaken via known methods.

In the embodiment shown, the plurality of image capture devices 104A-104C are shown arranged around the imaging location 108 and configured to capture lateral images from the multiple viewpoints 1, 2, and 3. The viewpoints 1, 2, and 3 may be spaced so that they are approximately equally spaced from one another, such as about 120 degrees from one another, as shown, when three image capture devices 104A, 104B, 104C are used. As depicted, the image capture devices 104A-104C may be arranged around the edges of a track 112 for moving specimen containers 102 to and from the imaging location 108. Other arrangements and spacing of the plurality of image capture devices 104A-104C may be used. In this way, the images of the specimen 212 in the specimen container 102 may be taken while the specimen container 102 is residing in a carrier 114, and in some cases on a track 112, at the imaging location 108. The images may overlap slightly in some embodiments.

The image capture devices 104A-104C may be provided in close proximity to and trained or focused to capture an image window, i.e., an imaging location 108 including an expected location of the specimen container 102, wherein the specimen container 102 may be stopped or placed so that it is approximately located in a center of the view window. In operation, each image may be triggered and captured responsive to a triggering signal send by the computer 110 and provided in communication lines 116A-116C when the computer 110 receives a signal that the carrier 114 is appropriately located at the imaging location 108 in the vision-based inspection system 100. Each of the captured images may be processed according to methods known in the art. In particular, image processing may be used to capture and process the images in order to characterize the specimen and specimen container 102 with a high level of detail and informational content.

In some embodiments, multiple spectral images may be captured while being back illuminated by light from the light panel assemblies 106A-106C within enclosure 118. The spectrally-switchable lighting sources embodied as the light panel assemblies 106A-106C may back light the specimen container 102 as shown in FIG. 1A and include an arrangement of switchable light sources including a plurality of LEDs or other light emitting devices. The capture and use of the multiple color images increases the information content for analysis and may emphasize certain characteristic absorption spectra when imaging at a specific spectrum.

In conventional use, the light panel assemblies 106A-106C provide homogeneous light emission over the entire field of view 120A-120C of the image capture devices 104A-104C. The vision-based inspection system 100 may include an enclosure 118 that may at least partially surround or cover the track 112, and the specimen container 102 may be located inside the enclosure 118 during the image capture operation. Enclosure 118 may include one or more doors 119 to allow the carriers 114 to enter into and/or exit from the enclosure 118.

Using the above-described setup, many multiple images taken at multiple exposure times for each respective spectra (e.g., R, G, B, white light, NIR, and/or IR) may be obtained in rapid succession, such that the entire collection of images for the specimen from multiple viewpoints 1, 2, and 3 may be obtained in less than a few seconds, for example. Other lengths of time may be used.

Figure 1B:
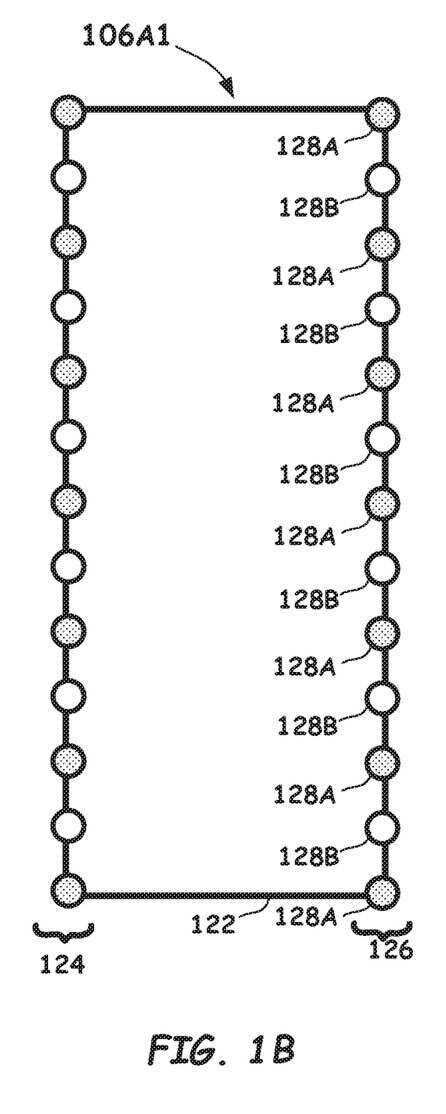
FIG. 1B is a schematic rear view of a first example LED panel assembly according to embodiments of the present disclosure.
Figure 1C:
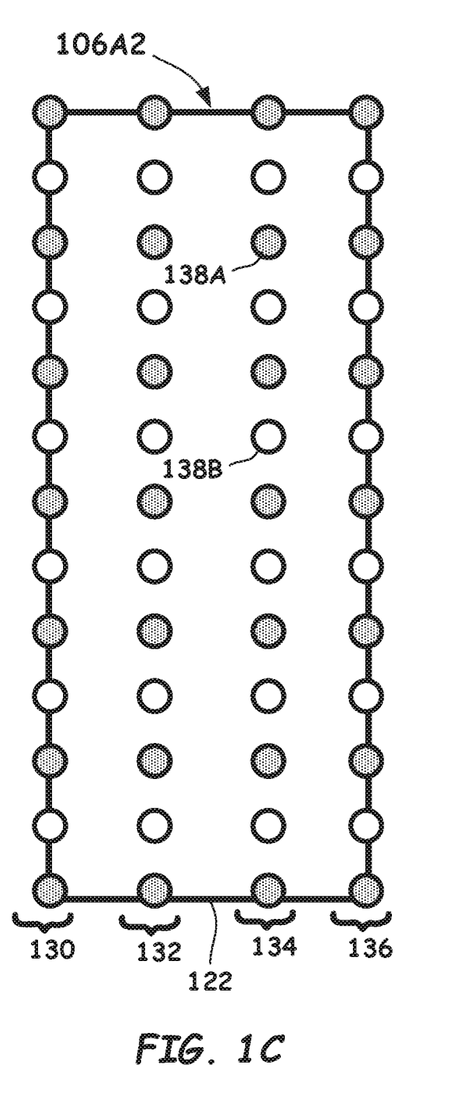
FIG. 1C is a schematic rear view of a second example LED panel assembly according to embodiments of the present disclosure.

Turning now to FIG. 1B, a rear view of first example embodiment of light panel assembly 106A1 is depicted schematically. The example light panel assembly 106A1 includes a display panel 122 with two arrays of LEDs 124, 126. In the example shown, each array 124, 126 includes two sets 128A, 128B of LEDs disposed in an alternating pattern, for example. In some embodiments, the two sets 128A, 128B are identical LEDs but are separately controllable. In other words, for example, set 128A can be turned on while set 128B is turned off and set 128A can be turned off while set 128B is turned on. FIG. 1C depicts a second example light panel assembly 106A2 that includes a diffuser panel 122 with four arrays of LEDs 130, 132, 134, 138. In the example shown, each array 130, 132, 134, 138 includes two sets 138A, 138B of LEDs disposed in an alternating pattern. In some embodiments, the two sets 138A, 138B are identical LEDs but are separately controllable. In other words, for example, set 138A can be turned on while set 138B is turned off and set 138A can be turned off while set 138B is turned on. Other arrangements of LEDs or light sources may be used.

In some embodiments, the different sets 128A, 128B (or 138A, 138B) can be controlled to emit different wavelengths of light and/or different intensities of light. Thus, for example, the light panel assembly 106A2 can be used to generate a first light intensity pattern 200 shown on the light panel assembly 106A2 in FIG. 2A by tuning on LED set 138A and turning off LED set 138B. The same light panel assembly 106A2 can also be used to generate a second light intensity pattern 200' different from the first light intensity pattern 200 as is shown on the light panel assembly 106A2 in FIG. 2B by tuning off LED set 138A and turning on LED set 138B. Thus, by switching different sets of the LEDs, the intensity distribution on the panel can be varied accordingly.

Figure 2A:
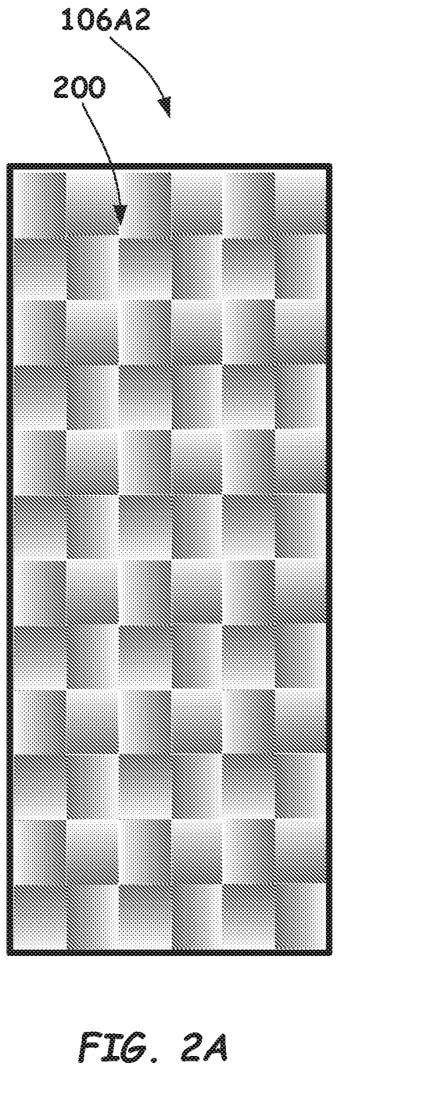
FIGS. 2A and 2B are schematic depictions of an LED panel assembly illuminated with two differing example light intensity patterns according to embodiments of the present disclosure.
Figure 2B:
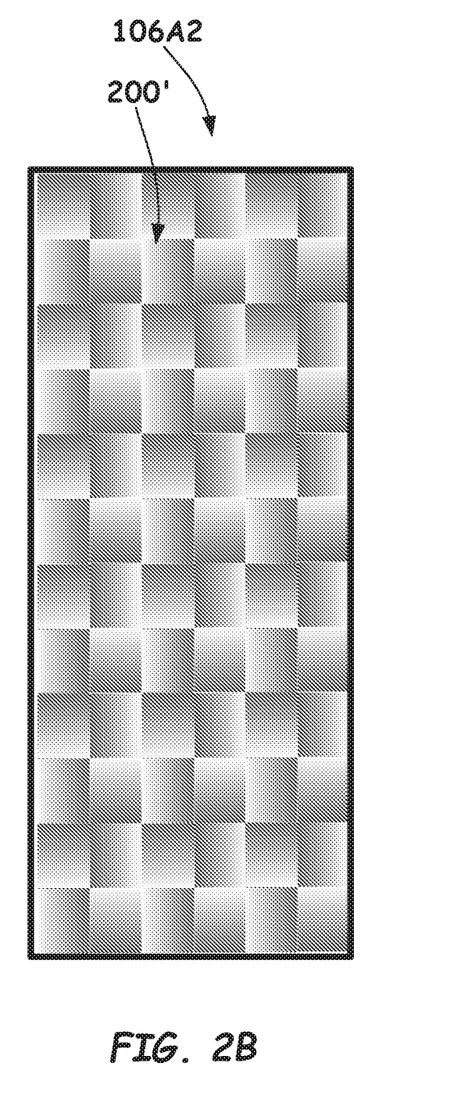

In some embodiments, different intensities (i.e., different current levels sent to the LED sets 138A, 138B) can be used to generate the two different patterns shown. Note, for example, that the patterns shown are complementary. In other words, in areas where one pattern is dark, the other pattern is light and vice versa. While other than perfectly complementary light intensity patterns can be used, in some embodiments, complementary patterns may more easily reveal defects.

In a diagnostic mode and without a specimen container 102 present at the image location 108, the system 100 can be configured to focus the image capture device 104A on the light panel assembly 106A. When there are debris (e.g., particles or the like) on the light panel assembly 106A or a scratch or other damage on either the light panel assembly 106A or the sensor (e.g., image capture device 104A), the light intensity distribution around the defect area is resistant to the changes of the LED patterns. Based on this realization, embodiments of this disclosure use a consistency check between images of the light panel assembly 106A illuminated with different light intensity (and/or wavelength) patterns to detect defects in the light panel assembly 106A or the sensor.

For example, the computer 110 can use the image capture device 104A to capture two images of the light panel assembly 106A illuminated with two different light intensity patterns 200, 200'. The computer 110 then processes the images by dividing each image into a grid of multiple, relatively small blocks and computes the cross-correlation between the images for each corresponding block. That is, for every block "B" in the two images "I" and "J", the correlation is computed with normalized cross correlation for every pixel p within the block B as shown below:

$$Corr(I(B), J(B)) = \frac{\Sigma_{p \in B}(I(p) - \overline{I(p)})(J(p) - \overline{J(p)})}{\sqrt{\Sigma_{p \in B}(I(p) - \overline{I(p)})^2} \sqrt{\Sigma_{p \in B}(J(p) - \overline{J(p)})^2}}$$

The higher the correlation as calculated based on the above formula, the higher probability that the block "B" contains defect for the optical components. In operation, a threshold correlation value may be set wherein any computed correlation above the threshold correlation value is deemed to indicate the presence of a defect in an optical component at that location.

Figure 3A:
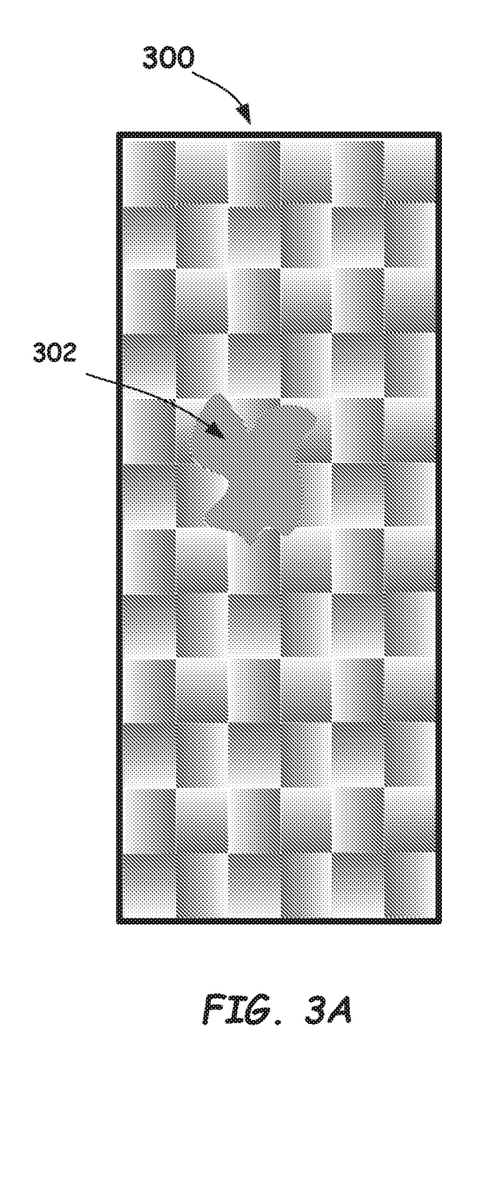
FIG. 3A is a schematic depiction of an LED panel assembly including a debris defect according to embodiments of the present disclosure.
Figure 4A:
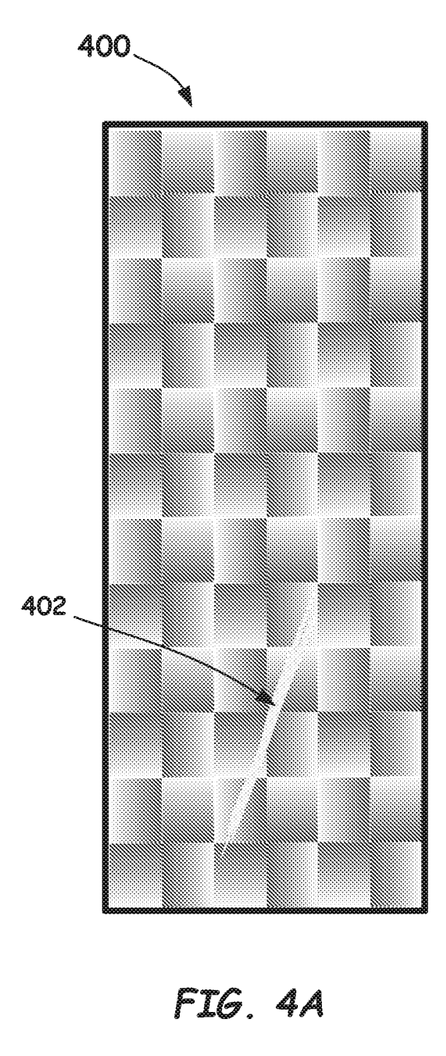
FIG. 4A is a schematic depiction of an LED panel assembly including a scratch defect according to embodiments of the present disclosure.

FIG. 3A depicts an example of a light panel assembly 300 that has debris particles 302 as a defect on the panel 300 where the problematic region is darker (i.e., a lesser light intensity level) than other regions of the panel 300. FIG. 4A depicts an example of a light panel assembly 400 that has a scratch or scratches 402 as a defect on the display panel of the panel 400 where the problematic region is lighter (i.e., a greater light intensity level) than other regions.

Figure 3B:
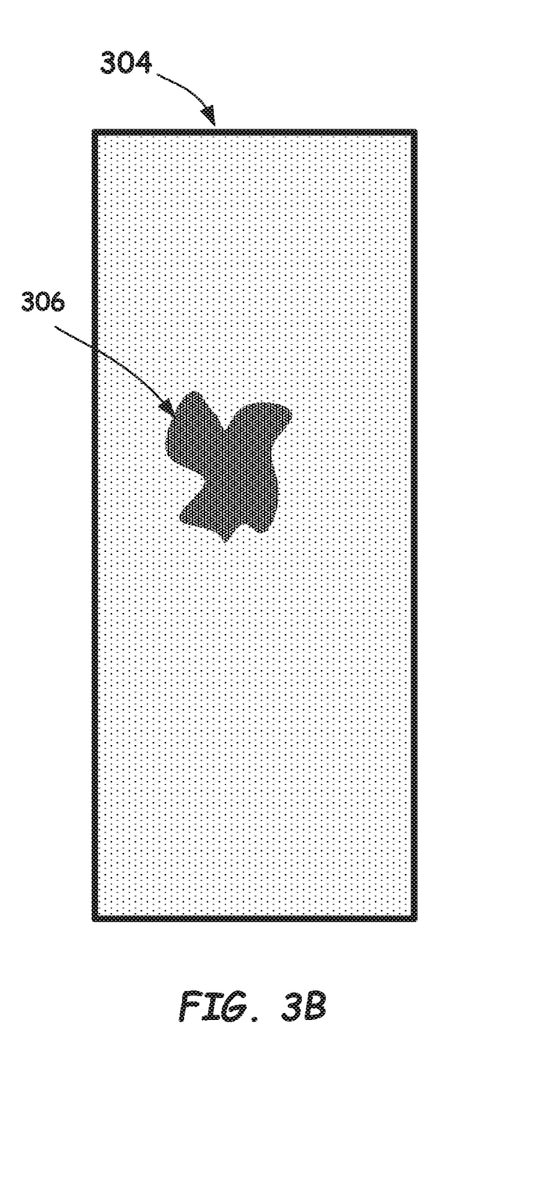
FIG. 3B is an example of a generated image correlation map according to embodiments of the present disclosure.
Figure 4B:
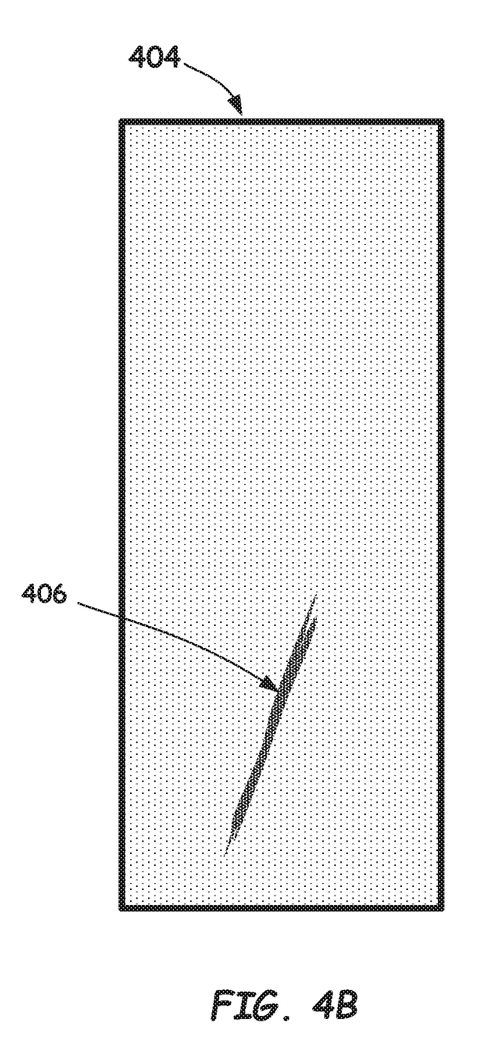
FIG. 4B is an example of a generated image correlation map according to embodiments of the present disclosure.

Using the methods of the present disclosure, both types of defects can be easily detected as shown in the generated image correlation map 304 of FIG. 3B (i.e., the dark area 306) and the generated image correlation map 404 of FIG. 4B (i.e., the dark area 406). Note that the generated image correlation maps 304, 404 represent a plot of the computed correlation wherein a correlation value below the predefined threshold correlation value results in the corresponding block being displayed as a relative light color and wherein a correlation value above the predefined threshold correlation value results in the corresponding block being displayed as a relative dark color.

Figure 5:
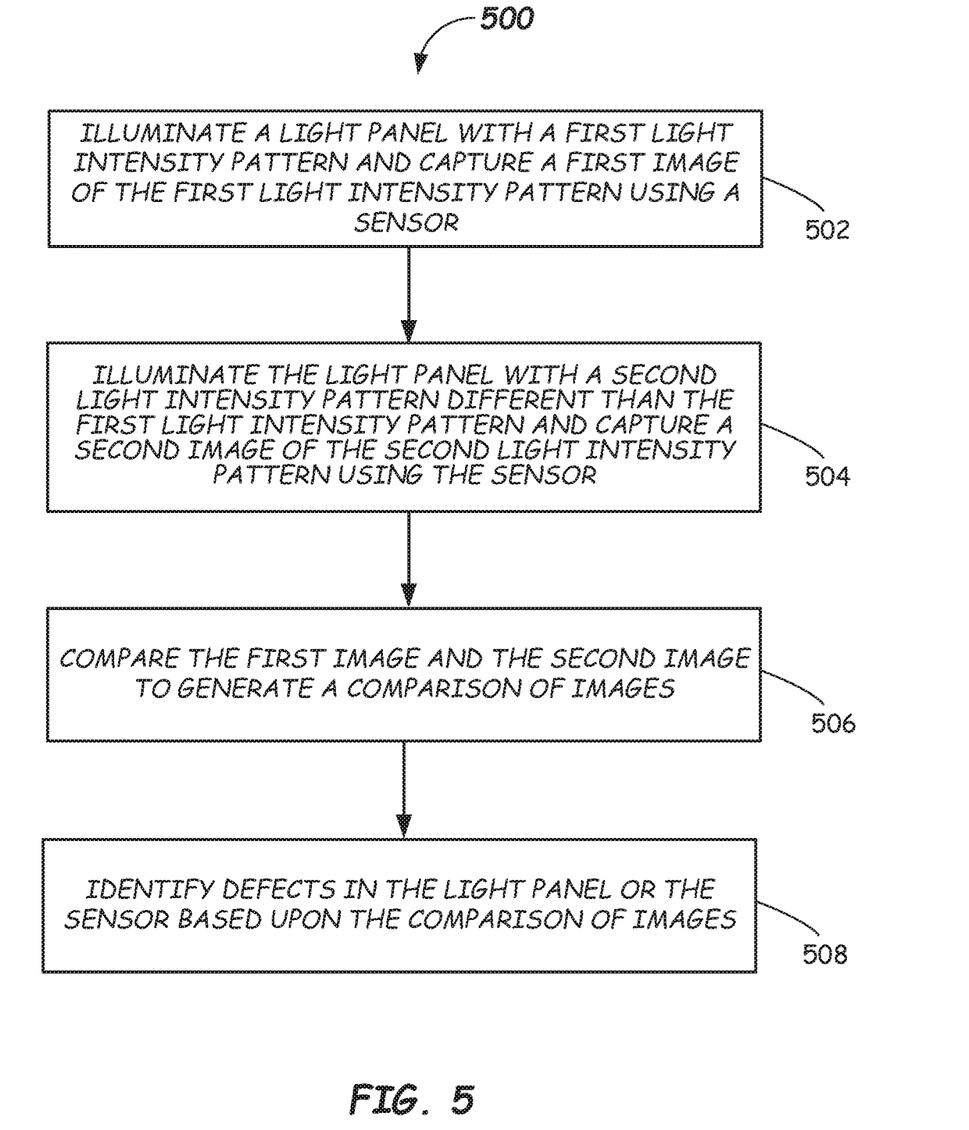
FIG. 5 is a flowchart depicting a first example method according to embodiments of the present disclosure.

FIG. 5 is a flowchart depicting an example method 500 of using the system 100 as described above to test the optical components for the presence of defects therein or thereon. In 502, a light panel (such as, e.g., the light panel assembly 104A) is illuminated with a first light intensity pattern (such as e.g., pattern 200 of FIG. 2A) and a sensor (such as e.g., image capture device 106A of FIG. 1) is used to capture a first image of the first light intensity pattern 200. The light panel is then, in 504, illuminated with a second light intensity pattern (such as e.g., pattern 200' of FIG. 2B) and the sensor is used to capture a second image of the second light intensity pattern 200'. Next, in 506, the two captured images (first image and second image) are compared (e.g., by computing a correlation between each corresponding block of the two images) to generate a comparison (e.g., mathematical comparison) of the images (e.g., an image correlation map as described above). Based upon the comparison of the images (i.e., the presence of a relatively high correlation area that exceeds a predefined threshold), the method, in 508, identifies the existence of a defect in the light panel sensor.

In some embodiments, the light intensity pattern can be changed by inserting a filter, or by using a changeable filter (e.g., a configurable light blocking LCD mask), disposed in front of the light panel. This can be alternative to or in addition to changing the intensity or wavelength of LEDs in the light panel assembly.

Figure 6:
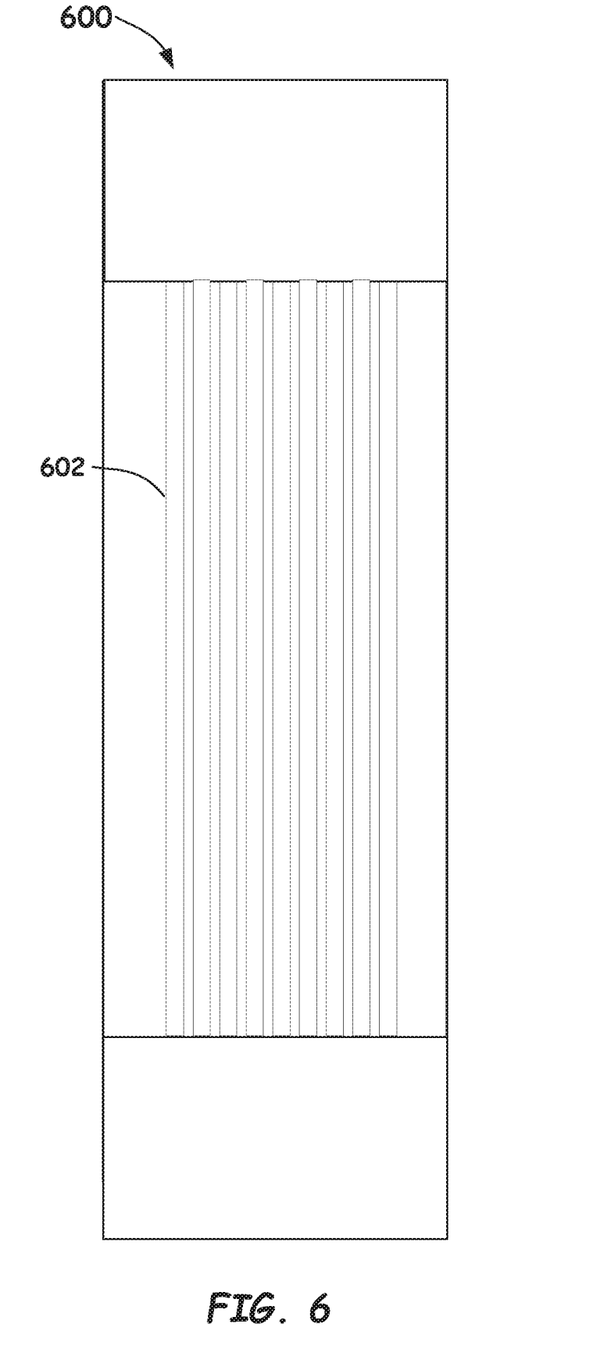
FIG. 6 depicts an example LCD filter according to embodiments of the present disclosure.

FIG. 6 depicts a schematic representation of an example of a configurable LCD mask 600 that is adapted to be installed in front of a light panel assembly 104A. The LCD mask 400 includes multiple LCD segments 602 that can be selectively activated (e.g., individually controlled segments 602 or collectively controlled sets of segments 602) to block or pass light emitted by the light panel assembly 104A.

Figure 7A:
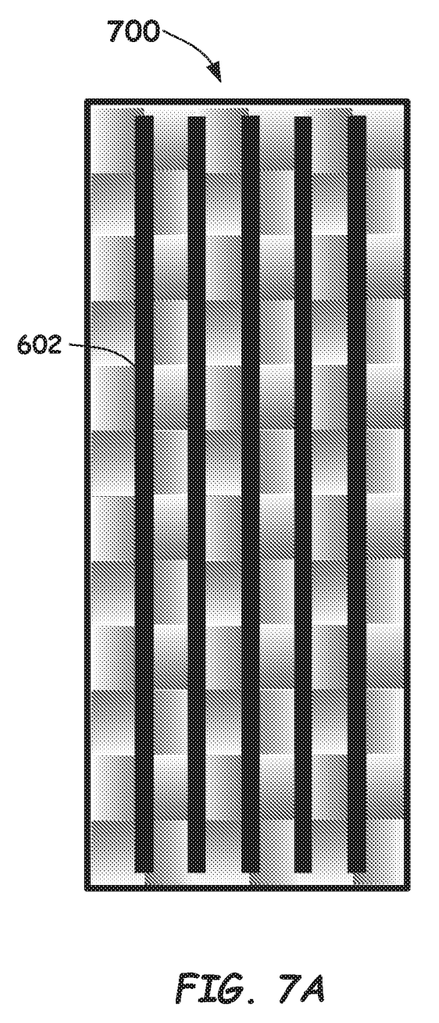
FIGS. 7A and 7B are schematic depictions of an LED panel assembly behind the LCD filter of FIG. 6 activated with two differing example filter patterns according to embodiments of the present disclosure.
Figure 7B:
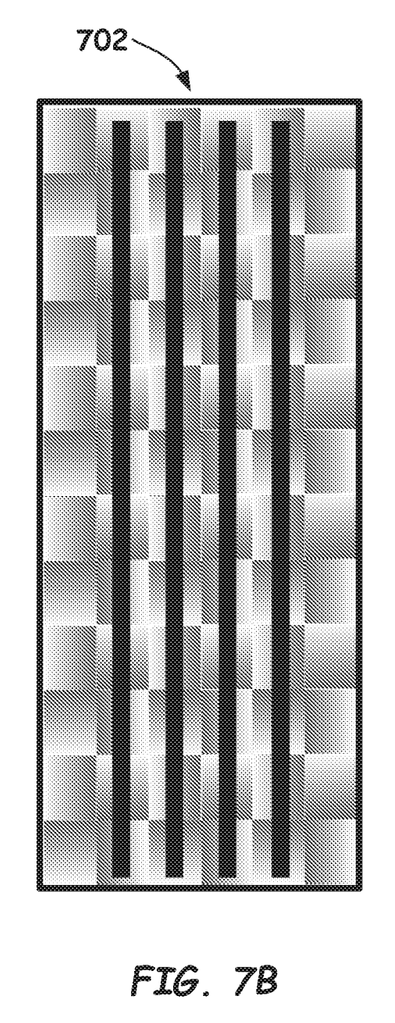

FIGS. 7A and 7B depict two different light intensity patterns 700, 702 generated by selectively activating two different sets of LCD segments 602 of the LCD mask 600. In alternative embodiments, two different light intensity patterns can be generated simply by activating all LCD segments 602 for one image and none for the second image. In some embodiments, the LCD segments can be used in combination with changing LED sets.

Figure 8A:
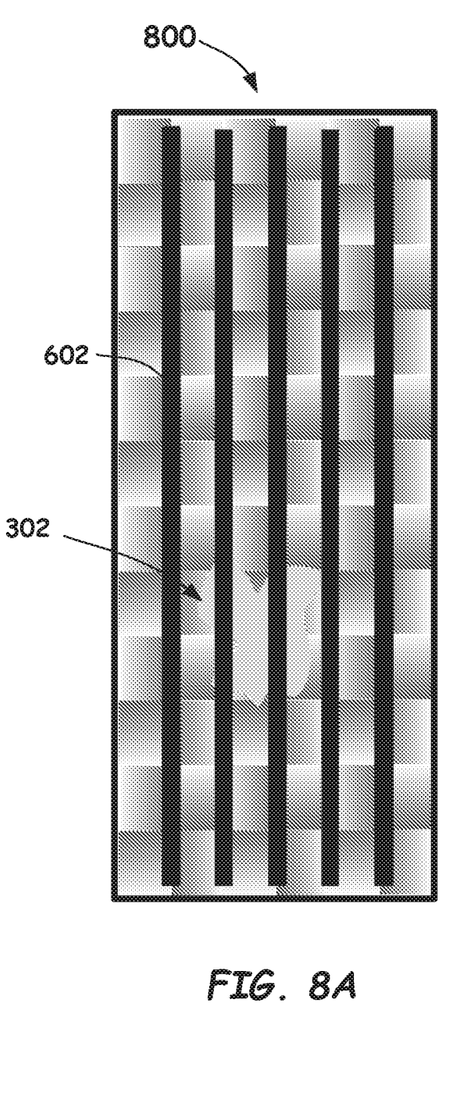
FIG. 8A is a schematic depiction of an LED panel assembly including a debris defect according to embodiments of the present disclosure.
Figure 8B:
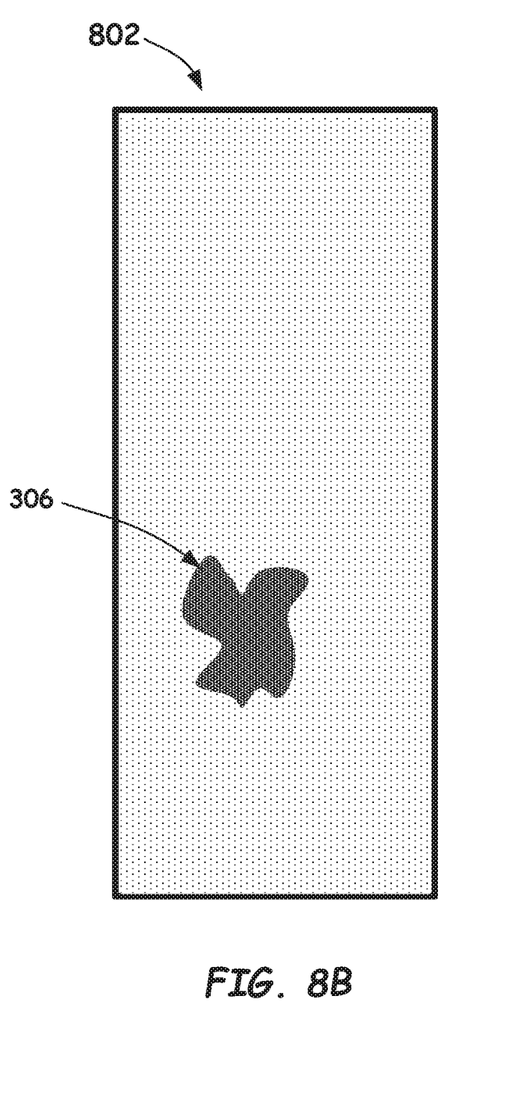
FIG. 8B is an example of a generated image correlation map according to embodiments of the present disclosure.

FIG. 8A depicts a light panel assembly 800 that includes debris particles 302 as a defect on the light panel assembly 800. FIG. 8B represents a plot of a correlation image between the images of the light panel assembly 800 captured with LCD segments 602 activated and captured with the LCD segments 602 not activated. Note that where the debris particles 302 are present in the image, there is a corresponding high correlation above the predefined correlation threshold that results in the dark area 306 and a low correlation below the predefined correlation threshold that results the remaining area being displayed in a light color.

Figure 9:
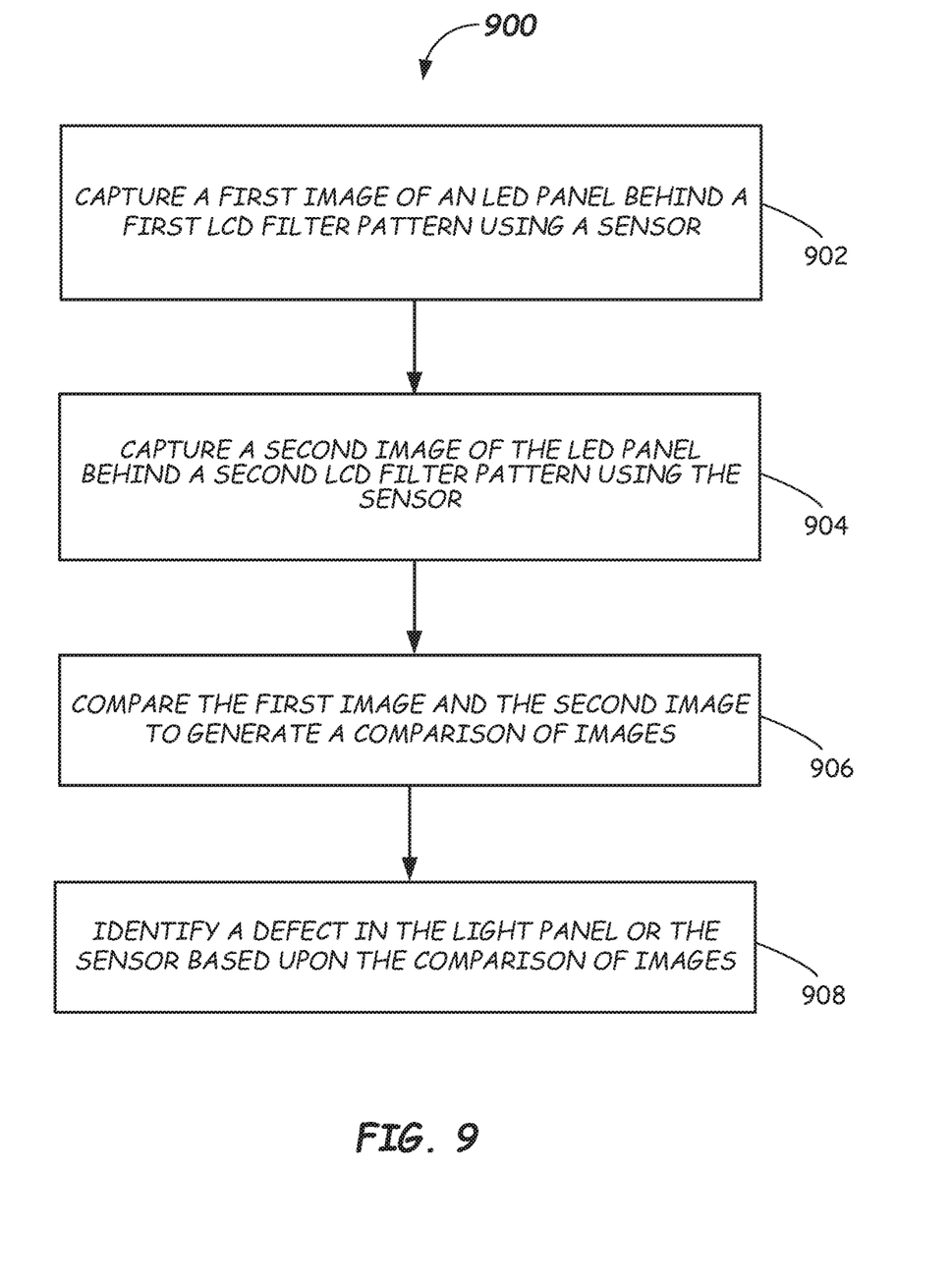
FIG. 9 is a flowchart depicting a second example method according to embodiments of the present disclosure.

FIG. 9 is a flowchart depicting a second method 900 of detecting a defect in optical components of a vision-based inspection system 100 using a filter (e.g., an LCD mask 600). In 902, a first image of an illuminated LED panel behind a first LCD filter pattern is captured. In 904, a second image of the illuminated LED panel behind a second LCD filter pattern is captured. Note that in some embodiments, the second LCD filter pattern could simply be the absence of any LCD filter pattern at all. Next, in 906, the two captured images are compared (e.g., by computing the correlation between each corresponding block of the images) to generate a comparison (e.g., mathematical comparison) of the images (e.g., an image correlation map as described above). In 908, based upon the comparison of the images (e.g., the presence of a relatively high correlation area that exceeds a predefined threshold), identify the existence of a defect in the light panel or the sensor.

An advantage of embodiments disclosed here is that various types of defects of the optical components can be readily detected. Since no tools beyond the components of the vision-based inspection system are used, the diagnostic methods disclosed herein can be conducted autonomously with no need to shut down the system and/or remove the enclosure. Thus, one or more defect checks can be undertaken before and/or after and image or a series of screening images of a specimen and/or specimen container are taken to confirm acceptable operation of the optical components.

Although the embodiments are described herein with reference to specific examples, the scope of the disclosure is not intended to be limited to the details described. Rather, various modifications may be made in the details within the scope and range of equivalents of this disclosure.

What is claimed is:

1. A method, comprising:
illuminating a light panel with a first light intensity pattern;
capturing a first image of the first light intensity pattern with a sensor;
illuminating the light panel with a second light intensity pattern different than the first light intensity pattern;
capturing a second image of the second light intensity pattern with the sensor;
comparing the first image and the second image to generate a comparison of the first image and the second image; and
identifying a defect in the light panel or the sensor based upon the comparison of the first image and the second image wherein an area in the first image appears identically as a corresponding area in the second image.

2. The method of claim 1 wherein comparing the first image and the second image includes calculating a correlation between portions of the first image and the second image.

3. The method of claim 1 wherein comparing the first image and the second image includes calculating correlations between several portions of the first image and the second image, wherein the portions are defined areas of the first image and the second image comprising blocks.

4. The method of claim 3 wherein the blocks are arranged in a grid covering the first image and the second image.

5. A method, comprising:
illuminating a light panel with a first light intensity pattern;
capturing a first image of the first light intensity pattern with a sensor;
illuminating the light panel with a second light intensity pattern different than the first light intensity pattern;
capturing a second image of the second light intensity pattern with the sensor;
comparing the first image and the second image to generate a comparison of the first image and the second image; and
identifying a defect in the light panel or the sensor based upon the comparison of the first image and the second image; wherein:
the comparing the first image and the second image includes calculating correlations between several portions of the first image and the second image, wherein the portions are defined areas of the first image and the second image comprising blocks; and
the correlations are calculated based on an equation:

$$Corr(I(B), J(B)) = \frac{\Sigma_{p \in B}(I(p) - \overline{I(p)})(J(p) - \overline{J(p)})}{\sqrt{\Sigma_{p \in B}(I(p) - \overline{I(p)})^2} \sqrt{\Sigma_{p \in B}(J(p) - \overline{J(p)})^2}}$$

wherein B represents an area being tested, I represents the first image, J represents the second image, and p represents each pixel belonging to block B.

6. The method of claim 5 wherein the defect is identified where a calculated correlation for a given block exceeds a predefined threshold.

7. The method of claim 1 wherein the first light intensity pattern is complimentary to the second light intensity pattern.

8. A system, comprising:
a computer including a memory storing instructions that are executable by the computer, the instructions including:
illuminate a light panel with a first light intensity pattern;
capture a first image of the first light intensity pattern with a sensor;
illuminate the light panel with a second light intensity pattern different than the first light intensity pattern;
capture a second image of the second light intensity pattern with the sensor;
compare the first image and the second image to generate a comparison of the first image and the second image; and
identify a defect in the light panel or the sensor based upon the comparison of the first image and the second image wherein an area in the first image appears identically as a corresponding area in the second image.

9. The system of claim 8 wherein comparing the first image and the second image includes calculating a correlation between a portion of the first image and the second image.

10. The system of claim 8 wherein comparing the first image and the second image includes calculating correlations between several portions of the first image and the second image, wherein the portions are defined areas of the first image and the second image comprising blocks.

11. The system of claim 10 wherein the blocks are arranged in a grid covering the first image and the second image.

12. A system, comprising:
a computer including a memory storing instructions that are executable by the computer, the instructions including:
illuminate a light panel with a first light intensity pattern;
capture a first image of the first light intensity pattern with a sensor;
illuminate the light panel with a second light intensity pattern different than the first light intensity pattern;
capture a second image of the second light intensity pattern with the sensor;
compare the first image and the second image to generate a comparison of the first image and the second image; and
identify a defect in the light panel or the sensor based upon the comparison of the first image and the second image; wherein:
the comparing the first image and the second image includes calculating correlations between several portions of the first image and the second image, wherein the portions are defined areas of the first image and the second image comprising blocks; and
the correlations are calculated based on an equation:

$$Corr(I(B), J(B)) = \frac{\Sigma_{p \in B}(I(p) - \overline{I(p)})(J(p) - \overline{J(p)})}{\sqrt{\Sigma_{p \in B}(I(p) - \overline{I(p)})^2} \sqrt{\Sigma_{p \in B}(J(p) - \overline{J(p)})^2}}$$

wherein B represents an area being tested, I represents the first image, J represents the second image, and p represents each pixel belonging to block B.

13. The system of claim 12 wherein the defect is identified where a calculated correlation for a given block exceeds a predefined threshold.

14. The system of claim 8 wherein the first light intensity pattern is complimentary to the second light intensity pattern.

15. A method, comprising:
capturing a first image of an illuminated light panel with a sensor;
activating a mask over the light panel to form a masked light panel;
capturing a second image of the masked light panel with the sensor;
comparing the first image and the second image to generate a comparison of the first image and the second image; and
identifying a defect in the light panel or the sensor based upon the comparison of the first image and the second image wherein an area in the first image appears identically as a corresponding area in the second image.

16. The method of claim 15 wherein comparing the first image and the second image includes calculating a correlation between a portion of the first image and the second image.

17. The method of claim 15 wherein comparing the first image and the second image includes calculating correlations between several portions of the first image and the second image, wherein the portions are defined areas of the first image and the second image comprising blocks.

18. The method of claim 17 wherein the blocks are arranged in a grid covering the first image and the second image.

19. A method, comprising:
capturing a first image of an illuminated light panel with a sensor;
activating a mask over the light panel to form a masked light panel;
capturing a second image of the masked light panel with the sensor;
comparing the first image and the second image to generate a comparison of the first image and the second image; and
identifying a defect in the light panel or the sensor based upon the comparison of the first image and the second image; wherein:
comparing the first image and the second image includes calculating correlations between several portions of the first image and the second image, wherein the portions are defined areas of the first image and the second image comprising blocks; and
the correlations are calculated based on an equation:

$$Corr(I(B), J(B)) = \frac{\Sigma_{p \in B}(I(p) - \overline{I(p)})(J(p) - \overline{J(p)})}{\sqrt{\Sigma_{p \in B}(I(p) - \overline{I(p)})^2} \sqrt{\Sigma_{p \in B}(J(p) - \overline{J(p)})^2}}$$

wherein B represents an area being tested, I represents the first image, J represents the second image, p represents each pixel belonging to block B.

20. The method of claim 19 wherein the defect is identified where a calculated correlation for a given block exceeds a predefined threshold.

\* \* \* \* \*